Figure 1:
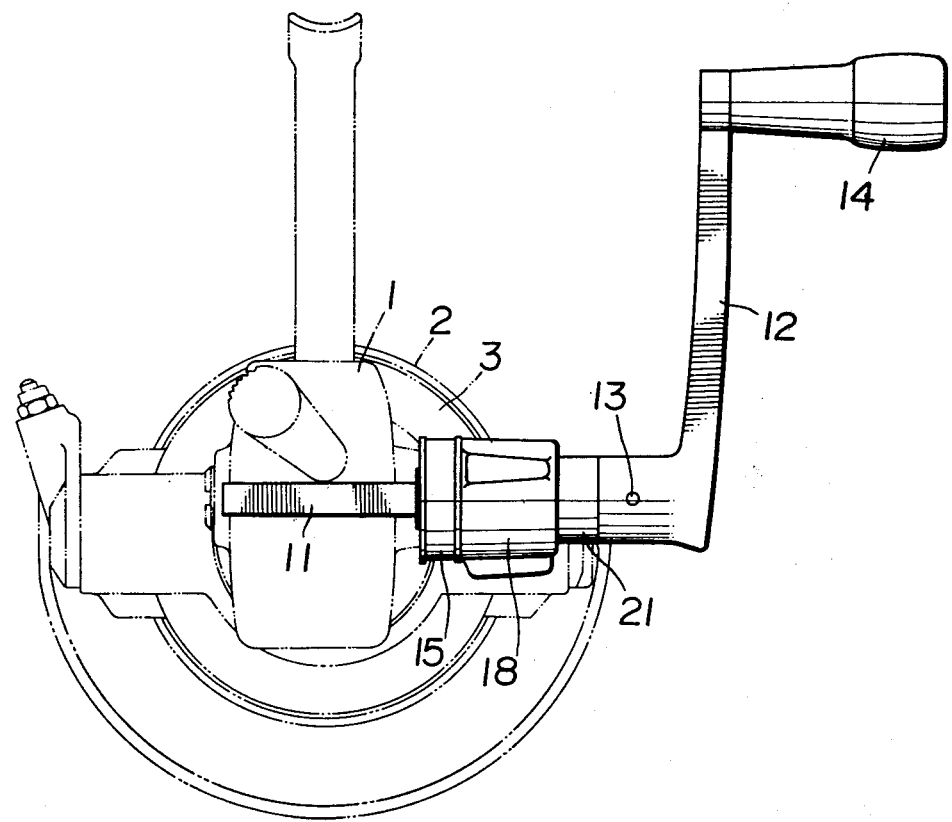

United States Patent [19]
Kimura

[11] 3,948,117
[45] Apr. 6, 1976

[54] OPERATING HANDLE OF A FISHING REEL
[75] Inventor: Takehiko Kimura, Sakai, Japan
[73] Assignee: Shimano Industrial Company, Limited, Sakai, Japan
[22] Filed: Oct. 31, 1974
[21] Appl. No.: 519,582

[30] Foreign Application Priority Data
Nov. 7, 1973 Japan.............................. 48-129410

[52] U.S. Cl.................. 74/547; 74/528; 242/84.1 J
[51] Int. Cl.² ......................................... G05G 5/06
[58] Field of Search ............ 74/547, 546, 524, 527; 242/84.1 J

[56] References Cited
UNITED STATES PATENTS
| | | | |
|---|---|---|---|
| 1,274,471 | 8/1918 | Todd | 74/547 X |
| 2,766,956 | 10/1956 | Sarah | 74/547 X |
| 3,464,289 | 9/1969 | Urbach | 74/547 X |

*Primary Examiner*—Samuel Scott
*Assistant Examiner*—F. D. Shoemaker
*Attorney, Agent, or Firm*—Stevens, Davis, Miller & Mosher

[57] ABSTRACT

An operating handle for a fishing reel having a drive shaft. The handle is movable between a folded position when the reel is not in use and a standing position when the reel is in use. The handle includes an arm which is pivotally connected to one end of a stud cooperable with the drive shaft. A sliding member, movable only axially with respect to the stud and located about the stud, abuts one end of the arm. An operating member, rotatably supported about the sliding member, operates a control mechanism which limits axial movement of the sliding member. Rotational movement of the operating member enables the sliding member to slide axially so that the arm may pivot to move into the folded or standing positions.

7 Claims, 9 Drawing Figures

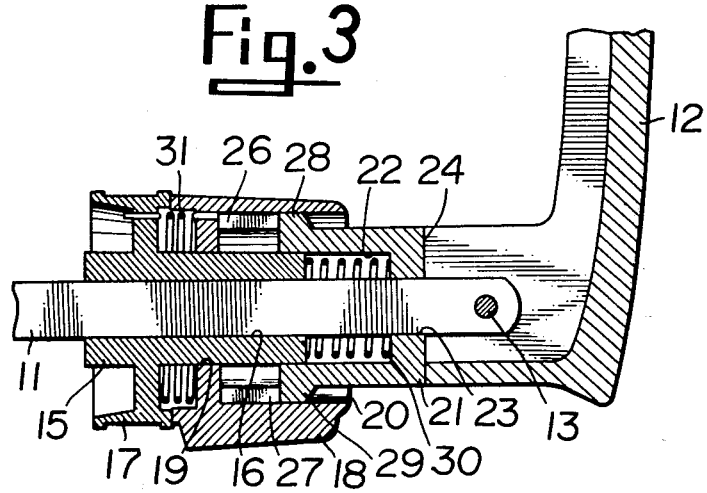
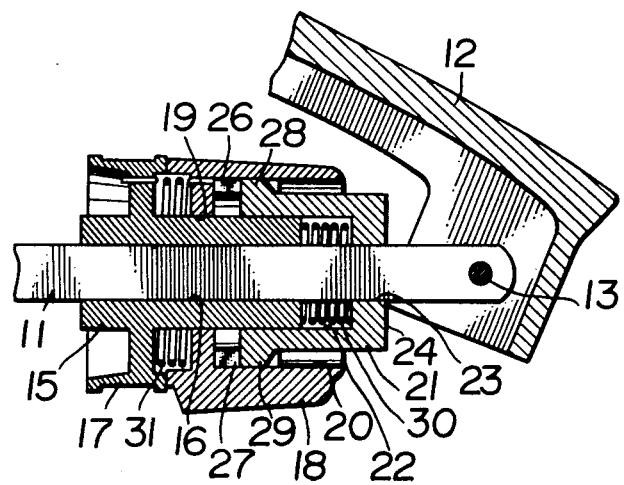

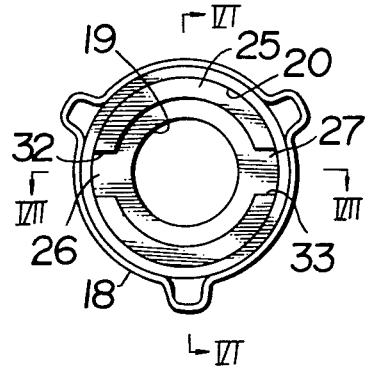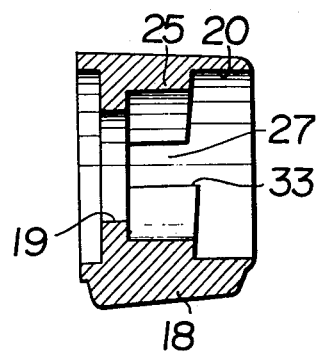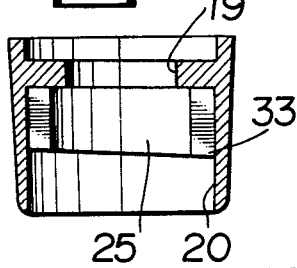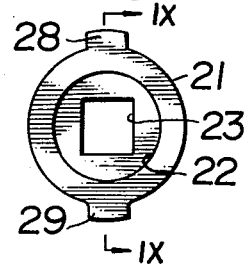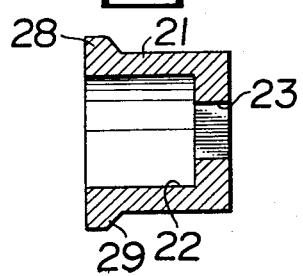

OPERATING HANDLE OF A FISHING REEL

This invention relates to an operating handle for a spinning type fishing reel, and more particularly to an operating handle which is inserted into a driving shaft at a reel body for rotating a rotary frame thereof through the driving shaft so that a fishing line may be wound onto a spool of the reel.

Conventionally, this kind of operating handle is formed separately from a reel body and insertibly mounted to a driving shaft therein after assembly of the reel body with the driving shaft and a transmitting mechanism for a rotary frame which rotates in relation to the driving shaft. The handle comprises a stud, an arm mounted to one end of the stud and a grip at an idle end of the arm. There are some handles having the stud and arm integrated with each other, but generally, the arm is pivoted to the stud through a pin perpendicular to an axis of the stud.

In such construction, the arm can be folded to the reel body side around the pivot when the reel is not in use. Thus, the reel will not be bulky since the handle arm will not just out of the reel body. However, such a conventional handle is provided with a support having an outer screw thread, and fixed to one end of the stud pivotally supporting the arm, the support being screwed with a cylindrical operating member having an inner screw thread. The operating member is rotated to travel back and forth with respect to the pivot of the arm so that the arm may readily stand or fold against the stud and may be held to stand rectangularly to the axis of the stud. Accordingly, the operating member should be rotatably operated several times in order to stand the arm from its folded position. Conversely, for making the arm fold around the pivot from its standing position, the operating member must be reversely rotated several times. Thus, there has been the problem that the handle is tedious to operate and takes too much time to move the arm into its standing or folded position.

The present invention has been designed in view of this point. A main object of the invention is to provide an operating handle of a fishing reel, which is capable of being simply quickly operable for making a handle arm stand rectangularly with respect to a handle stud, or fold thereagainst. Another object of the invention is to provide an operating handle in which the arm will not fail to move to the standing or folded position even after long use.

Figure 2:
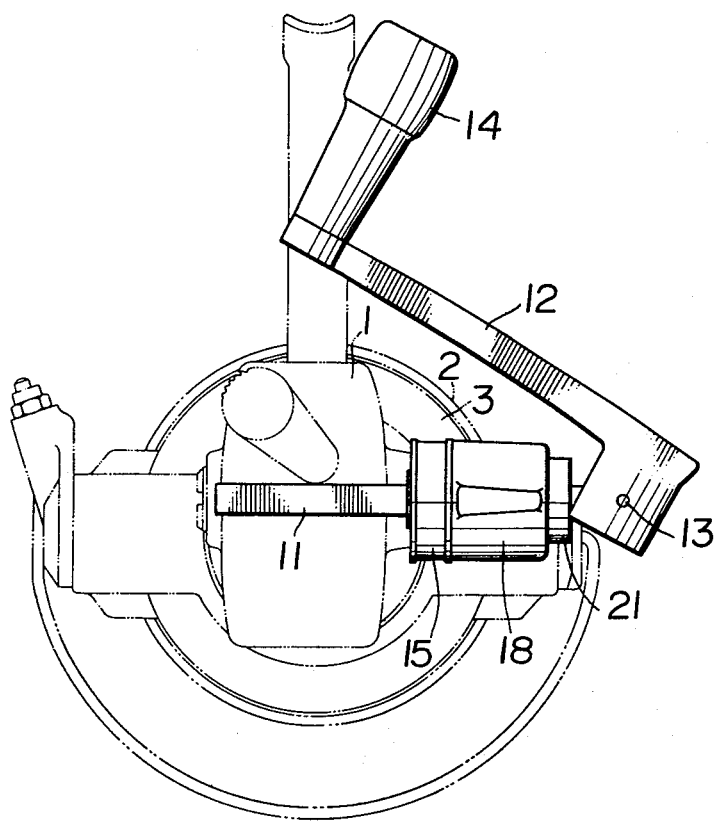

Other objects and merits of the invention will be apparent from the following description in accordance with the accompanying drawings, in which:

FIGS. 1 and 2 illustrate an operating handle of the invention in a state of use, FIG. 1 is a rear view of a handle arm thereof at a standing position, FIG. 2 is a rear view of the aron at a folded position, FIG. 3 is an enlarged vertical sectional view of the principal portion of the operating handle shown in FIG. 1, FIG. 4 is an enlarged vertical sectional view of the principal portion of the operating handle shown in FIG. 2, FIG. 5 is a side view of an operating member as described hereinafter, FIG. 6 is a cross sectional view taken on Line VI—VI in FIG. 5, FIG. 7 is a cross sectional view take on Line VII—VII in FIG. 5, FIG. 8 is a side view of a sliding member as described hereinafter, and FIG. 9 is a cross sectional view taken on Line IX—IX in FIG. 8.

An operating handle of a fishing reel of the invention comprises a stud 11 of a square sectional shape which is rotatably supported on the reel body 1 supporting a spool 2 as well as a rotary frame 3 and is inserted into a square axle hole of a driving shaft (not shown) connected co-operatively with the rotary frame 3 so as to be rotatable together with the driving shaft, and a handle arm 12 which has a grip at a free end and is pivotally attached to one end of stud 11 through a pin 13 so that it may freely fold or stand with respect to the shaft. In addition, the reel body construction is well known so that details thereof are deleted from the description.

The stud 11 is provided with a support 15 which is formed of a cylindrical body having an circular outer periphery and at the center thereof a square axle hole 16 engageable with the stud 11. The support 15 is provided at the outer periphery of a lengthwise end portion thereof with a ring portion 17 of a greater diameter, whereby the support 15 is insertibly fixed to the stud 11 through the square axle hole 16.

An operating member 18 is supported on the circular outer periphery of the support 15, and has a round hole 19 engageable with the outer periphery of the support 15. Adjacent to the member 18 is a circular recess 20 of a greater diameter than the outer diameter of the support 15, so that the operating member 18 may be insertibly supported by the support 15 through the hole 19.

The operating member 18 is restricted from axial movement by a snap ring (not shown) so as to be only rotatably supported on the stud 11 through the support 15.

In addition, the stud 11 holds a sliding member 21 which has a circular recess 22 engageable with the circular outer periphery of the support 15 and a square hole 23 engageable with the stud 11, the hole 23 being inserted onto the stud 11 and the recess 22 being inserted onto the outer periphery of the support 15, whereby the sliding member 21 is unrotatable and only axially movable with respect to the stud 11. Incidentally, the sliding member 21 iw provided with a control face 24 contactable against the handle arm 12 to control the arm to enable positioning of the arm in the standing or folded position.

Between the operating member 18 and the sliding member 21 there is provided means for controlling entry of the latter into the recess 20 of the former, which means comprises a swollen portion 25 formed at the inner surface of circular recess 20 and cut by two parallel linear grooves 26 and 27 extending in the axial direction of the recess, and two projections 28 and 29 at the outer periphery of the sliding member which are insertible in grooves 26, 27 respectively so that the sliding member 21 may be allowed to enter into the recess 20 at the predetermined position in a circumferential relationship with the operating member when the projections 28 and 29 and the grooves 26 and 27 become engageable with each other. The sliding member 21 is prevented from entering into the recess at the relative position of both members other than the abovementioned.

Furthermore, the sliding member 21 has a means for always pushing it out from the recess towards the handle arm 12, which means employs a coil spring 20 inserted between the support 15 and the sliding member 21, and the operating member 18 has a means to return the same to the original position from a predetermined rotatable position thereof, which means employs a coil spring 31 which is retained at one end thereof to the support 15 and at the other end thereof to the operating member 18.

Also, the operating member 18 is provided with two faces 32 and 33 serving to stop the rotation of the same at the predetermined position as aforementioned. These two faces 32 and 33 are formed at one end surface of swollen portion 25 opposite to the sliding member 21 in a manner that each widthwise one edge of the grooves 26 and 27 cutting the abovementioned end surface is made to be lengthwise extended towards the sliding member 21 to an extent slightly greater than each opposite edge of the grooves respectively.

The operating handle of the invention is constructed as aforegoing, and is applicable in a manner that the handle when not in use when an angler brings the reel to or from a fishing place, has the arm 12 folded around a pin 13 closely to the reel body 1, while, in actual use thereof at the fishing place, the handle arm is raised around the pin 13 to become fixed to the stud 11 in a standing position. In the case that the arm 12 is folded toward the reel body, the operating member 18 is turned against the resilient force of the spring 31 until the faces 32 and 33 of the same come in contact with the projections 28 and 29 of the sliding members 21. At this time, the operating member 18 is so positioned that the grooves 26 and 27 may become engageable with the projections 28 and 29 respectively, thus the sliding member 21 becomes insertible into the recess 20. Accordingly, the handle arm 12 becomes turnable around the pin 13 while the sliding member 21 is pushed into the recess 20 against the force of spring 30, whereby the same folds closely to the reel body. After pushing the sliding member into the recess, the expanding force of spring 30 housed in the sliding member 21, forces the control face 24 to be resiliently abutted against the corner of the end surface of handle arm 12 so that the handle arm is urged to be turned more closely to the reel body, thereby making it possible to keep the handle arm in an exactly folded state.

On the other hand, it is enough only to turn the handle arm 12 around the pin 13 for the purpose of fixing the same to the stud in a standing position by raising it from the folded position. Namely, the sliding member 21 is urged in the outward direction with respect to the recess 20 to the extent as shown in FIG. 3 by means of the resilient force of the coil spring 30 accompanying the turn of the handle arm towards the standing position, and the projections 28 and 29 are urged outwardly of the grooves 26 and 27 by means of the outwardly slidable motion of sliding member 21. Simultaneously, the operating member 18 is rotated by the return force of coil spring 31. As the result, the projections 28 and 29 become disengagable from the grooves 26 and 27 respectively to be positioned in contact with the end surface of the swollen portion 25, opposite to the sliding member 21. Accordingly, the sliding member 21 is abutted against the end surface of the swollen portion 25 resulting in being prevented from moving in the inward direction thereof, namely, entering into the swollen portion 25, so that the sliding member 21 may be abutted at the control face 24 thereof against the handle arm end surface for restricting the handle arm 12 from being turned more, thereby keeping the handle arm fixed in the standing position with respect to the stud 11.

Next, the construction of the invention modified in design, will be described. One modification is a means for restricting the sliding member 21 from entering into the swollen portion of the recess 20 in a manner that the projections 28 and 29 are formed at the inner surface of the recess 20 and the grooves 26 and 27 at the outer periphery of the sliding member 21, that is, conversely of the previously described embodiment.

Another is that the faces 32 and 33 for retaining the rotation of the operating member 18 at the predetermined position, are formed at an end surface of the sliding member 21 opposite to the operating member 18 in place of being formed at the swollen portion side of the embodiment.

While a preferred embodiment of the invention has been described, such description is for illustrative purposes only, and it is to be understood that changes and variations may be made without departing from the spirit of the following claims.

What is claimed is:

1. An operating handle of a fishing reel for rotating a driving shaft having a square axle hole and supported on a body of the reel, comprising:
   a. a stud extending into the square axle hole and cooperable with the driving shaft;
   b. a handle arm pivoted at one end to one end of said stud with a pin extending perpendicularly to an axis of said stud, said arm having at the other end a grip and being freely turnable around the pivot to two positions with respect to said stud, one of said positions being a standing position and the other being a folded position in which said arm makes an acute angle with respect to said stud;
   c. a sliding member movably supported on said stud in an axial direction of said stud to contact said arm and being nonrotatable with respect to said stud, said sliding member having a cylindrical body and being closed at one end and open at the other end, said closed end having at the center thereof a square hole engageable with said stud, and said closed end having a control face formed at an outer surface opposite said handle arm, said control face limiting movement of said arm to a predetermined folded position and keeping said arm in the standing position;
   d. a push-out means, extending between said sliding member and said stud, for always resiliently urging said sliding member towards said handle arm along said stud;
   e. an operating member rotatably supported on said stud, said operating member having a cylinder-like shape and a recess of an inner diameter larger than the outer diameter of said sliding member, said recess receiving said open end of said sliding member; and
   f. means for restricting said sliding member from being axially moved, including grooves extending axially of said stud at an inner periphery of said operating member and projections formed at an outer periphery of said sliding member, said restricting means permitting said projections to enter said grooves respectively so that said handle arm may be placed in the folded position when said operating member is placed in a given circumferential position with respect to said sliding member, and preventing said projections from entering the grooves to restrict axial movement of said sliding member so that said handle arm may be kept in the standing position when said operating member is not in said give position.

2. The operating handle according to claim 1, further comprising means, connected between said operating member and said stud, for rotatably restoring said operating member from the given circumferential position with respect to said sliding member.

3. The operating handle according to claim 1 wherein said restricting means includes a portion swollen from the inner surface of the recess of said operating member in the radial direction thereof and extending at a given length throughout the depth of said recess, said swollen portion having said grooves extending axially of said stud.

4. The operating handle according to claim 3, wherein said swollen portion includes end surfaces opposite said sliding member, said end surfaces being stoppers for restricting the rotation of said operating member in a manner that one edge of each of the grooves extends lengthwise in excess of the other edge of each of the grooves opposite the one edge, whereby said operating member may be brought into contact with said projections.

5. An operating handle of a fishing reel for rotating a driving shaft having a square axle hole and supported on a body of the reel, comprising:
   a. a stud extending into the square axle hole and cooperable with the driving shaft, said stud having a square section;
   b. a handle arm pivoted at one end to one end of said stud with a pin extending perpendicularly to an axis of said stud, said arm having at the other end a grip and being freely turnable around the pivot to two positions with respect to said stud, one of said positions being a standing position and the other being a folded position in which said arm makes an acute angle with respect to said stud;
   c. a supporting member fixed to said stud at a position apart from the pivot for said handle arm, said supporting member having a round outer periphery;
   d. a sliding member movably supported on said stud in an axial direction of said stud to contact said arm and being nonrotatable with respect to said stud, said sliding member having a cylindrical body having one closed end, an open end and an inner diameter slightly larger than an outer diameter of said supporting member, said closed end having at the center thereof a square through hole and at an outer surface a control face opposite said handle arm, said square through hole being in engagement with said stud so that the sliding member is nonrotatably supported to said stud, said control face controlling said handle arm in the folded position and keeping said arm in the standing position;
   e. a push-out means, extending between said sliding member and said stud, for always resiliently urging said sliding member towards said handle arm along said stud;
   f. an operating member rotatably supported on said outer periphery of said supporting member, said operating member having a cylinder-like shape and a recess of an inner diameter larger than an outer diameter of said sliding member, said recess receiving said open end of said sliding member; and
   g. means for restricting said sliding member from being axially moved, including grooves extending axially of said stud at an inner periphery of said operating member and projections formed at an outer periphery of said sliding member, said restricting means permitting said projections to enter said grooves respectively so that said handle arm may be placed in the folded position when said operating member is placed in a given circumferential position with respect to said sliding member, and preventing said projections from entering the grooves to restrict axial movement of said sliding member so that said handle arm may be kept in the standing position when said operating member is not in said given position.

6. An operating handle of a fishing reel for rotating a driving shaft having a square axle hole and supported on a body of the reel, comprising:
   a. a stud extending into the square axle hole and cooperable with the driving shaft;
   b. a handle arm pivoted at one end to one end of said stud with a pin extending perpendicularly to an axis of said stud, said arm having at the other end a grip and being freely turnable around the pivot to two positions with respect to said stud, one of said positions being a standing position and the other being a folded position in which said arm makes an acute angle with respect to said stud;
   c. a sliding member movably supported on said stud in an axial direction of said stud to contact said arm and being nonrotatable with respect to said stud, said sliding member having a cylindrical body and being closed at one end and open at the other end, said closed end having at the center thereof a square hole engageable with said stud, and said closed end having a control face formed at an outer surface opposite said handle arm, said control face limiting movement of said arm to a predetermined folded position and keeping said arm in the standing position;
   d. a push-out means, extending between said sliding member and said stud, for always resiliently urging said sliding member towards said handle arm along said stud;
   e. an operating member rotatably supported on said stud, said operating member having a cylinder-like shape and a recess of an inner diameter larger than the outer diameter of said sliding member, said recess receiving said open end of said sliding member; and
   f. means for restricting said sliding member from being axially moved, including grooves extending axially of said stud at the outer periphery of said sliding member and projections formed at the inner periphery of said operating member, said restricting means permitting said projections to enter said grooves respectively so that said handle arm may be placed in the folded position when said operating member is placed in a given circumferential position with respect to said sliding member, and preventing said projections from entering the grooves to restrict axial movement of said sliding member so that said handle arm may be kept in the standing position when said operating member is not in said given position.

7. An operating handle of a fishing reel for rotating a driving shaft having a square axle hole and supported on a body of the reel, comprising:
- a. a stud extending into the square axle hole and cooperable with the driving shaft, said stud having a square section;
- b. a handle arm pivoted at one end to one end of said stud with a pin extending perpendicularly to an axis of said stud, said arm having at the other end a grip and being freely turnable around the pivot to two positions with respect to said stud, one of said positions being a standing position and the other being a folded position in which said arm makes an acute angle with respect to said stud;
- c. a supporting member fixed to said stud at a position apart from the pivot for said handle arm, said supporting member having a round outer periphery;
- d. a sliding member movably suported on said stud in an axial direction of said stud to contact said arm and being nonrotatable with respect to said stud, said sliding member having a cylindrical body having one closed end, an open end and an inner diameter slightly larger than an outer diameter of said supporting member, said closed end having at the center thereof a square through hole and at an outer surface a control face opposite said handle arm, said square through hole being in engagement with said stud so that the sliding member is nonrotatably supported to said stud, said control face controlling said handle arm in the folded position and keeping said arm in the standing position;
- e. a push-out means, extending between said sliding member and said stud, for always resiliently urging said sliding member towards said handle arm along said stud;
- f. an operating member rotatably supported on said outer periphery of said supporting member, said operating member having a cylinder-like shape and a recess of an inner diameter larger than an outer diameter of said sliding member, said recess receiving said open end of said sliding member; and
- g. means for restricting said sliding member from being axially moved, including grooves extending axially of said stud at the outer periphery of said sliding member and projections formed at the inner periphery of said operating member, said restricting means permitting said projections to enter said grooves respectively so that said handle arm may be placed in the folded position when said operating member is placed in a given circumferential position with respect to said sliding member, and preventing said projections from entering the grooves to restrict axial movement of said sliding member so that said handle arm may be kept in the standing position when said operating member is not in said given position.

* * * * *